United States Patent [19]

Caprino

[11] 3,895,115

[45] July 15, 1975

[54] METHOD OF INHIBITING PLATELET AGGREGATION

[75] Inventor: Luciano Caprino, Rome, Italy

[73] Assignee: Istituto Farmacologico Serono S.p.A., Rome, Italy

[22] Filed: Mar. 1, 1974

[21] Appl. No.: 447,275

[52] U.S. Cl. .................................................. 424/272
[51] Int. Cl.² ......................................... A61K 31/42
[58] Field of Search ...................................... 424/272

[56] References Cited
UNITED STATES PATENTS 3,557,135   1/1971   Marchetti..................... 260/307 R

OTHER PUBLICATIONS

Caprino et al., Reprint from Arzneim.–Forsch. (Drug Res.) 23, Nr. 9, 1283–1287 (1973).

Caprino et al., Reprint from Arzneim.–Forsch. (Drug Res.) 23, Nr. 9, 1277–1283 (1973).

*Primary Examiner*—Stanley J. Friedman
*Attorney, Agent, or Firm*—Ostrolenk, Faber, Gerb & Soffen

[57] ABSTRACT

A method of inhibiting platelet aggregation using 2-bis($\beta$-hydroxyethyl)amino-4,5-diphenyloxazole as the anti-aggregating agent.

5 Claims, No Drawings

METHOD OF INHIBITING PLATELET AGGREGATION

DETAILED DESCRIPTION OF THE INVENTION

This invention relates to a method of inhibiting platelet aggregation.

The interest in drugs capable of inhibiting platelet aggregation is mainly related to the discovery that platelets play an important role in thromboembolic disease.

The arterial thrombus mainly consists of platelets and fibrin strands. For this reason, the anticoagulants, although effective in the treatment of venous thrombotic disease, have not been generally helpful in preventing arterial thrombosis. On the other hand, the predominance of platelets in this latter type of clot has suggested that drugs interfering with platelet function may be more useful than the standard anticoagulant therapy.

Furthermore, it has been experimentally shown that the substances released by platelet aggregates can initiate a process leading to the formation of new intravascular platelet aggregates which, in turn, can cause organ dysfunction, vessel injury and thus further platelet aggregation.

A key step in stimulation of platelets is the interaction of the subendothelial tissue (collagen, basement membrane, elastin) of the arterial wall with the platelets. Many authors have found in man a relationship between occlusive arterial thrombi and breaks of atherosclerotic plaque. There is, therefore, strong evidence that an alteration (such as cell loss or break) of the endothelial membrane with exposure of collagen, microfibrils, elastin, etc. will induce adherence of platelets both to the damaged site and to each other.

From the above, the desirability of providing an effective method of inhibiting platelet aggregation clearly appears. Platelet aggregation is inhibited by a number of substances. However, the use of these substances as antiaggregating and potential anti-thrombotic agents is often limited by their unacceptable in vivo side effects or undesirable biological activities.

Among the substances which have been shown to be useful for the above therapeutic purpose are the non-steroid, anti-inflammatory drugs. Unfortunately, these drugs are neither capable of inhibiting platelet aggregation in all of its forms, nor are they free from severe undesirable side effects. In fact, although the non-steroid, anti-inflammatory drugs are effective in inhibiting the release of platelet constituents induced by collagen, gamma-globulin coated surfaces, antigen-antibody complexes, thrombine and adrenaline, they do not inhibit the primary platelet aggregation, that is, that induced by ADP.

Moreover, it is well known that most of the anti-inflammatory drugs induce gastric haemorrhagic lesions and ulcers. Therefore, the need exists of a new drug which is capable of inhibiting ADP, collagen, adrenaline induced platelet aggregation without showing the undesirable side effects of most of the anti-inflammatory drugs.

I have now found that the compound 2-bis($\beta$-hydroxyethyl) amino-4,5-diphenyloxazole, having the structure:

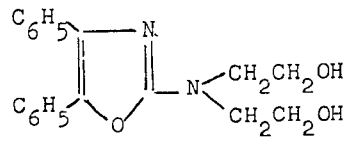

previously disclosed as an anti-inflammatory drug, is effective in inhibiting platelet aggregation when tested in vitro on the ADP, collagen and adrenaline induced platelet aggregation in rabbit platelet-rich plasma. The same activity has been shown by the above compound on human plasma after in vivo administration.

Platelet aggregation studies have been performed on rabbit or human platelet-rich plasma at a constant temperature of 37°C, using the turbidometric method of Born described in Nature (London), 194,927 (1962). Aggregation curves have been read following the method described by O'Brien et al., Thromb. Diath. Haemorrhag. 16, 751 (1966).

In order to show the absence of ulcerogenic effects of the compound 2-bis($\beta$-hydroxyethyl)amino-4,5-diphenyloxazole (hereinafter referred to as Ditazole) in comparison with the most widely known compounds belonging to the category of anti-inflammatory drugs, the induction of gastric lesions in experimental animals has also been evaluated. Male Wistar rats weighing 170–190 g. were given the tested drugs orally for 17 consecutive days after a daily fasting period of 8 hours. When Indomethacin was tested, the drug was orally administered for 1 day only to the animals which had been kept fasting for 18 hours. At the end of the experiments, all of the surviving animals were sacrificed, their stomachs removed and microscopically examined for the presence of any lesions on the gastric walls.

As shown by the following Table 1, acetylsalicylic acid, Indomethacin and, to a lesser extent, phenylbutazone exhibit the ability to inhibit collagen and adrenaline induced platelet aggregation. However, no significant effects can be found on ADP-induced platelet aggregation. Sodium salicylate has no remarkable antiaggregating activity.

On the other hand, Ditazole shows a strong antiaggregating activity on both adrenaline and collagen induced platelet aggregation and, in addition, an appreciable effect on ADP induced platelet aggregation.

Acetyl salicylic acid, Indomethacin, phenylbutazone and sodium salicylate induce gastric haemorrhagic lesions when administered at the same dose levels as are effective in the usual anti-inflammatory tests. On the contrary, Ditazole does not display any significant ulcer-inducing activity even at higher doses.

TABLE 1

| COMPOUND | INDUCTION OF GASTRIC LESIONS | INHIBITION OF PLATELET AGGREGATION INDUCED BY | | |
|---|---|---|---|---|
| | | A D P | Collagen | Adrenaline |
| Acetyl Salicylate Acid | +++ | − | +++ | ++ |
| Ditazole | − | + | ++++ | +++ |
| Indomethacin | +++ | − | +++ | ++ |
| Phenylbutazone | ++ | − | ++ | + |
| Sodium Salicylate | ++ | − | + | − |

TABLE 1-Continued

| COMPOUND | INDUCTION OF GASTRIC LESIONS | INHIBITION OF PLATELET AGGREGATION INDUCED BY | | |
|---|---|---|---|---|
| | | ADP | Collagen | Adrenaline |
| | % of ulcerated rats | active at: | active at: | active at: |
| − | 0 | + = $2\times10^{-4}$M or above | + = $10^{-4}$M or above | + = $5\times10^{-4}$M or above |
| + | up to 33.3% | ++ = $10^{-5}$M or above | ++ = $5\times10^{-5}$M or above | ++ = $10^{-4}$M or above |
| ++ | up to 66.6% | − = inactive | +++ = $10^{-5}$M or above | +++ = $5\times10^{-5}$M or above |
| +++ | up to 99.9% | | ++++ = $5\times10^{-6}$M or above | − = inactive |
| | | Adenosine = ++ | | |

Further in vitro platelet aggregation studies after in vivo administration to humans were carried out as follows: Apparently healthy volunteers of 24 to 55 years of age, who had not received any drugs for at least 7 days prior to the study, were investigated in the fasting state.

Twelve subjects received 800 mg. of Ditazole daily for 2 days. Measurements were made both before and 2 days after the start of drug administration.

Another group of four subjects received only placebo. Measurements were made as indicated above for the first group. Slope and maximum transmission were recorded both before and after the drug administration, and expressed as % change of the "after" measurement with respect to the "before" measurement of the same parameter.

In the case of collagen-induced platelet aggregation, the delay time ("reaction time") in seconds from the addition of the aggregating agent to the inflection of the curve was also measured and expressed as % change as above.

Negative figures in slope and maximum transmission % changes indicate that anti-aggregating activity is present; positive figures in "reaction time" % changes indicate that the compound is effective in prolonging the reaction time in the collagen-induced platelet aggregation test.

The results are summarized in Tables 2 and 3.

TABLE 2

ADP (5 μg/ml.) INDUCED PLATELET AGGREGATION IN HUMAN PLASMA

| DRUG | NO. OF SUBJECTS | SLOPE, % CHANGE | MAX.TRANSMISSION, % CHANGE |
|---|---|---|---|
| DITAZOLE | 12 | − 20.50 | − 3.04 |
| PLACEBO | 4 | − 5.50 | +18.4 |

TABLE 3

COLLAGEN (80 μg/ml) INDUCED PLATELET AGGREGATION IN HUMAN PLASMA

| DRUG | NO. OF SUBJECTS | SLOPE, % CHANGE | MAX. TRANSMISSION, % CHANGE | REACTION TIME, % CHANGE |
|---|---|---|---|---|
| DITAZOLE | 6 | −24.56 | +1.95 | +119.00 |
| PLACEBO | 4 | +15.30 | +7.98 | +15.87 |

Acute toxicity has been determined on Ditazole, phenylbutazone and indomethacin in mice and rats by oral and i.p. administration. The results are given in Table 4.

TABLE 4

ACUTE TOXICITIES

| ANIMAL | COMPOUND | ROUTE | $LD_{50}$, mg/kg |
|---|---|---|---|
| MOUSE | DITAZOLE | oral | 9621 |
| | DITAZOLE | i.p. | 3390 |
| | PHENYLBUTAZONE | oral | 658.4 |
| | PHENYLBUTAZONE | i.p. | 256.7 |
| | INDOMETHACIN | oral | 25.38 |
| | INDOMETHACIN | i.p. | 15.21 |
| RAT | DITAZOLE | oral | 11380 |
| | DITAZOLE | i.p. | 7770 |
| | PHENYLBUTAZONE | oral | 392.9 |
| | PHENYLBUTAZONE | i.p. | 202.8 |
| | INDOMETHACIN | oral | 35.10 |
| | INDOMETHACIN | i.p. | 27.75 |

The above data clearly indicate that Ditazole is free from side effects, has a low toxicity and is a potent inhibitor of platelet aggregation. This evidence also suggests that the above compound is a potentially useful anti-thrombotic agent.

The compound useful in the practice of this invention can be formulated into suitable pharmaceutical dosage forms, e.g., coated or uncoated tablets, capsules, syrups, suspensions, suppositories, etc., by combining it with pharmaceutically acceptable carriers or diluents, in accordance with methods well known in the art. Suitable examples of dosage formulations useful in the practice of this invention are as follows:

EXAMPLE 1

Capsules containing 200 mg. of the active substance and having the following composition were prepared:

| | |
|---|---|
| Ditazole | 200 mg. |
| glycocoll | 100 mg. |
| starch | 50 mg. |
| talc | 10 mg. |
| magnesium stearate | 10 mg. |
| | 370 mg. |

EXAMPLE 2

Suppositories were prepared, according to methods well known in the art, having the following composition:

| | |
|---|---|
| Ditazole | 400 mg. |
| Polyoxyethyleneglycol 6000 | 345 mg. |
| Polyoxyethyleneglycol 1540 | 805 mg. |
| | 1550 mg. |

A therapeutically effective daily dose in man has been found to be approximately 800 mg. Preferably, the drug is orally administered.

What I claim is:

1. A method of inhibiting platelet aggregation comprising the administration to man or animal in need of such treatment of a therapeutically effective amount of 2-bis($\beta$-hydroxyethyl)amino-4,5-diphenyloxazole.

2. The therapeutic method of claim 1 in which 2-bis($\beta$-hydroxyethyl)amino-4,5-diphenyloxazole is administered in combination with a pharmaceutically acceptable carrier or diluent.

3. The therapeutic method of claim 2 in which the 2-bis($\beta$-hydroxyethyl)amino-4,5-diphenyloxazole is orally administered.

4. The therapeutic method of claim 3 in which the 2-bis($\beta$-hydroxyethyl)amino-4,5-diphenyloxazole is orally administered in the form of a capsule thereof.

5. The therapeutic method of claim 1 wherein said therapeutically effective amount is approximately 800 mg per day.

* * * * *